United States Patent [19]

Urano et al.

[11] Patent Number: 5,428,101

[45] Date of Patent: Jun. 27, 1995

[54] SOLVENT BASED COATING COMPOSITION

[75] Inventors: Satoshi Urano, Tsuzuki; Noriyuki Tsuboniwa, Higashiosaka; Kei Aoki, Ikoma; Hirotoshi Umemoto, Uji, all of Japan

[73] Assignee: Nippon Paint Co., Ltd., Osaka, Japan

[21] Appl. No.: 210,270

[22] Filed: Mar. 18, 1994

Related U.S. Application Data

[63] Continuation of Ser. No. 7,353, Jan. 21, 1993, abandoned, which is a continuation of Ser. No. 895,428, Jun. 5, 1992, abandoned, which is a continuation of Ser. No. 567,295, Aug. 14, 1990, abandoned.

[30] Foreign Application Priority Data

Aug. 17, 1989 [JP] Japan .................................. 1-213226

[51] Int. Cl.⁶ ............................................. C09D 133/00
[52] U.S. Cl. ....................... 524/521; 524/547; 524/555; 524/315; 524/379; 525/217; 525/218; 525/212; 526/304; 526/307.5; 526/307.6
[58] Field of Search ................ 524/521, 547; 526/304, 526/306, 307, 307.5, 307.6; 525/217, 218, 212

[56] References Cited

U.S. PATENT DOCUMENTS

| | | | |
|---|---|---|---|
| 4,225,693 | 9/1980 | McCormick | 526/261 |
| 4,659,795 | 4/1987 | Tsutsui et al. | 526/301 |
| 4,788,256 | 11/1988 | Aoki et al. | 526/328.4 |
| 4,816,537 | 3/1989 | Tsuboniwa | 526/301 |
| 4,914,225 | 4/1990 | Suzuki | 560/145 |
| 4,935,413 | 6/1990 | Urano et al. | 514/178 |
| 4,956,491 | 8/1990 | Suzuki | 560/172 |
| 4,970,281 | 11/1990 | Suzuki | 560/304 |
| 5,128,232 | 7/1992 | Thackeray et al. | 430/192 |
| 5,243,069 | 9/1993 | Emmons | 560/224 |

FOREIGN PATENT DOCUMENTS

| | | |
|---|---|---|
| 0206544 | 12/1986 | European Pat. Off. . |
| 0243160 | 10/1987 | European Pat. Off. . |
| 2197025 | 3/1974 | France . |

OTHER PUBLICATIONS

J. Brandrup and E. H. Immergut, Eds., Polymer Handbook, 2nd. ed. Wiley, New York, 1975, pp. IV-343.

J. Brandrup and E. H. Immergut, Polymer Handbook, 2nd. Ed., Wiley Interscience, New York, 1975, IV-341,344.

*Primary Examiner*—Mark Nagumo
*Attorney, Agent, or Firm*—Wenderoth, Lind & Ponack

[57] ABSTRACT

Disclosed is a solvent based coating composition comprising at least one vinyl polymer and an organic solvent, wherein said vinyl polymer(s) has at least one group consisting of an active hydrogen-containing group and a substituted acylamide group, and said vinyl polymer(s) contains the above described two groups as a whole.

4 Claims, No Drawings

SOLVENT BASED COATING COMPOSITION

This application is a continuation of application, Ser. No. 08/007,353, filed Jan. 21, 1993, which is a continuation of application, Ser. No. 07/895,428, filed Jun. 5, 1992, which in turn is a continuation of application, Ser. No. 07/567,295, filed Aug. 14, 1990, all three prior applications being now abandoned.

FIELD OF THE INVENTION

The present invention relates to a solvent based coating composition, in particular to a one-pack coating composition which is stable at ambient temperature.

BACKGROUND OF THE INVENTION

A compound having a reactive substituted acylamide group and a polymerizable carbon-carbon double bond, i.e. a substituted acylamide compound represented by the following formula (1), is known to the art, as a compound which achieves crosslinking reaction (Japanese Kokai Specification No. 275259/1986);

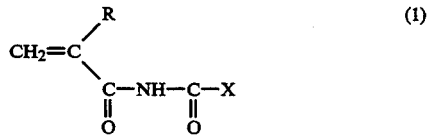

(1)

wherein R represents a hydrogen atom or a lower alkyl group, and X represents an alkoxy group, an amino group, an amide group, an iminooxy group or a sulfide group, which may be substituted with other groups.

Polymers which contain both an active hydrogen and a substituted acylamide group, prepared by polymerizing the above described substituted acylamide compounds with active hydrogen-containing ethylenic unsaturated compounds, have also been proposed in Japanese Kokai Specification No. 46207/1988. In addition, there has been proposed a water dispersible resin which is obtained by polymerizing the above described substituted acylamide compounds with an acidic group- or basic group-containing ethylenic unsaturated compounds (see Japanese Kokai Specification No. 46203/1988).

Further studies have been conducted on applications of the polymer prepared from the substituted acylamide compounds in paints.

SUMMARY OF THE INVENTION

The present invention provides a solvent based coating composition comprising at least one kind of vinyl polymer and an organic solvent, wherein any one of said vinyl polymers has at least one active hydrogen-containing group and a substituted acylamide group, and wherein said vinyl polymer contains the two kinds of said groups as a whole.

DETAILED DESCRIPTION OF THE INVENTION

According to the present invention, it is essential that a substituted acylamide group and an active hydrogen-containing group are present in the resinous components of the coating compositions. Accordingly, the above described two functional groups may be contained in the same resin. In addition, the above described two functional groups may be contained in different resins, that is two kinds of resins. Further, the one functional group, for example the substituted acylamide group may be contained in two different resins.

The active hydrogen-containing group of the present invention includes a carboxyl group, a hydroxyl group, an amino group, a thiol group, a sulfonic acid group and the like.

The vinyl polymers used for the coating composition according to the present invention can be synthesized by polymerizing the substituted acylamide compounds (I) through carbon-carbon double bonds.

Monomers used for the synthesis include active hydrogen group-containing ethylenic unsaturated compounds and, if necessary, ethylenic unsaturated compounds without such functional groups. These monomeric compounds are suitably combined to form the polymers. The polymerization conditions of these monomeric compounds can be greatly varied in accordance with the type of monomers used in the polymerization, the polymerization degree and the like.

The active hydrogen-containing ethylenic unsaturated compounds include unsaturated acids (for example, acrylic acid, methacrylic acid, crotonic acid, cinnamic acid, 2-isopropylacrylic acid, trans-2-decenoic acid, cis-2-decenoic acid, α-chloroacrylic acid, β-trans-nitroacrylic acid, isocrotonic acid, 2-pentenic acid, 2-ethylacrylic acid, tiglic acid, 3,3-dimethylacrylic acid, propylacrylic acid, itaconic acid, 2-methyl-3-ethylacrylic acid, 2-ethylcrotonic acid, maleic acid, trimethylacrylic acid, butylacrylic acid, 2-methyl-2-hexenoic acid, 3-methyl-3-propylacrylic acid, 2,3-diethylacrylic acid, 4-methyl-2-hexenoic acid, 3,3-diethylacrylic acid, 3-tert-butylacrylic acid, 2,3-dimetyl-3-ethylacrylic acid, 3-methyl-isopropylacrylic acid, 2-octenoic acid, 2-pentylacrylic acid, 2-butylcrotonic acid, 2-nonenoic acid, 2-hexylacrylic acid and 4-ethyl-2-octenoic acid), unsaturated alcohols (for example, monoesters of the above described unsaturated acids and glycols (such as, ethylene glycol and propylene glycol), crotonic alcohol, cinnamyl alcohol and o-hydroxystyrene), unsaturated amides (for example, acrylamide, methacrylamide, crotonamide, cinnamamide, p-benzamidestyrene, methylacrylamide, glycolate-methyl ether and methacrylamide propanesulfonic acid), unsaturated sulfonic acids or salts thereof (for example, 2-sulfoethyl acrylate, 2-sulfoethyl methacrylate, t-butylacrylamidesulfonic acid, 4-sulfophenyl acrylate and p-vinylbenzenesulfonic acid), unsaturated phosphoric acids (for example, acidphosphoxyethyl methacrylate, 3-chloro-2-amidephosphoxypropyl methacrylate, acidphosphoxypropyl methacrylate, vinylphosphate and isopropenyl phosphate) and the like. These may be used singly or in combination.

The vinyl polymers of the present invention are polymerized from the above described two types of monomers, but other monomers without the above described functional groups may be used, if necessary. The other monomers include monoolefines and diolefines (for example, styrene, α-methylstyrene, α-ethylstyrene, isobutylene, 2-methylbutene-1, 2-methylpentene-1, 2,3-dimetylbutene-1, 2,3-dimethylpentene-1, 2,4-dimethylpentene-1, 2,3,3-trimethyl-heptene-1, 2,3-dimethyl-hexene-1, 2,4-dimethyl-hexene-1, 2,5-dimethylhexene-1, 2-methyl-3-ethylpentene-1, 2,3,3-trimethylpentene-1, 2,3,4-trimethylpentene-1, 2,3,4-trimethyl-pentene-1,2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, butadiene-1,3 and isoprene), halogenated monoolefines and diolefines (for example, α-chlorostyrene, α-bromostyrene, 2,5-dichlorostyrene, 2,5-dibromostyrene, 3,4-dichlorostyrene, ortho-, metha- and para-fluorostyrene, 2,6-dichlorostyrene, 3-fluoro-4-chlorostyrene, 3-chloro-4-fluorostyrene, 2,4,5-trichlorostyrene, dichloromonofluorostyrene, 2-chloropropene, 2,6-difluorostyrene, 2-chlorobutene, 2-chloropentene, 2-chlorohexene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylene, 1,2-dibromoethylene, 1,2-difluoroethylene, 1,2-diiodoethylene, chloroethylene(vinyl chloride), 1,1-dichloroethylene(vinylidene chloride), bromoethylene, fluoroethylene, iodoethylene, 1,1-dibromoethylene, 1,1-difluoroethylene, 1,1-diiodoethylene, 1,1,2-trifluoroethylene and chlorobutadiene), esters of organic and inorganic acids (for example, vinyl acetate, vinyl propionate, vinyl butylate, vinyl isobutylate, vinyl caproate, vinyl enanthate, vinyl benzoate, vinyl toluate, vinyl-p-chlorobenzoate, vinyl-o-chlorobenzoate, vinyl-p-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acryalte, heptyl acrylate, octyl acrylate, allyl chloride, allyl cyanide, allyl bromide, allyl fluoride, allyl iodide, allyl chloride carbonate, allyl nitrate, allyl thiocyanate, allyl acetate, acetate propionate, allyl butylate, allyl valeate, allyl caproate, decyl-α-chloroacrylate, methyl-α-cyanoacrylate, ethyl-α-cyanoacrylate, amyl-α-cyanoacrylate, decyl-α-cyanoacrylate, dimethyl maleate, diethyl maleate, diallyl maleate, dimethyl fumarate, diethyl fumarate, and diethyl glutaconate), organic nitriles (for example, acrylonitrile, methacrylonitrile, ethacrylonitrile, 3-octenenitrile, crotonitrile and oleonitrile) and the like.

The above described monomer compounds are subjected to polymerization, for example radical polymerization, in a solvent which is inert to the polymerization reaction. In the case of the radical polymerization, the usual radical initiators are used. The radical initiators include azobisisobutylonitrile, benzoyl peroxide, cumene hydroperoxide, tetramethylthiuram disulfide, 2,2'-azobis(4-methoxy-2,4-dimethylvaleronitrile), acetylcyclohexylsulfonyl peroxide, 2,2'-azobis(2,4-dimetyl-valeronitrile) and the like. The initiators are generally used in a quantity of 0.1 to 10% by weight based on the total of the monomers. The polymerization temperature is usually 20° to 200° C., preferably 80° to 150° C.

The solvent employed in the polymerization reaction is inert to the polymerization reaction, but includes hydrocarbons, ethers, ketones, esters, alcohols, amides, sulfoxides and the like. The solvent may be substituted with a group which is inert to the polymerization reaction. The substituted acylamide compounds (I) and the solvent for polymerization are explained in Japanese Kokai Specification Nos. 2752591/1986 and 46207/1988.

In the polymerization, other additives, for example polymerization regulators and the like, may be added in case of need.

It is desirable that the equivalence of the substituted acylamide group in the resin components used in the present invention is $1 \times 10^{-5}$ or more, preferably within the range of $1 \times 10^{-4}$ to $50 \times 10^{-4}$. The equivalence of the substituted acylamide group is expressed by the equivalence of the substituted acylamide group based on 1 g of all resin components. In the event that the equivalence of the substituted acylamide group is less than $1 \times 10^{-5}$, the paint can not be sufficiently cured. It is desirable that the equivalence of the active hydrogen (expressed by the equivalence of the active hydrogen existing in all resin components of 1 g in the same manner as the above described equivalence of the substituted acylamide group) is $1 \times 10^{-5}$ or more, preferably within the range of $5.0 \times 10^{-4}$ to $50 \times 10^{-4}$. If the equivalence of the active hydrogen is less than $1 \times 10^{-5}$, the paint can not be sufficiently cured when baked. The number of the substituted acylamide groups in one molecule of the polymer is not limited, but preferably at least 6, more preferably at least 8. At least 6 substituted acylamide groups enhance the curing ability at low temperatures and the physical properties of the cured coatings.

The preparation of the above described vinyl polymer, i.e. the limitation of the equivalences of the respective functional groups, has been known to the person skilled in the art and can be achieved by selecting the polymerization conditions, the modification conditions and other conditions. The number average molecular weight of the vinyl polymer is that molecular weight which has been usually used for the paints and it is desirable that the number average molecular weight of the resins is for example 1,000 to 100,000, preferably 1,000 to 50,000. If the number average molecular weight is out of this range, the cured film is poor in coating properties.

The coating composition according to the present invention can be used as a clear paint as it is. In addition, the anti-sagging agents, the shedding-preventing agents, the surface tension-regulating agents, the antioxidants, the photostabilizers, the ultraviolet absorbents, the setting preventing agents and the like may be added in accordance with the usual art of producing paints.

The solvent based coating composition of the present invention is formed by dispersing the above mentioned components in an organic solvent other than water. Examples of the organic solvents are hydrocarbons, ketones, ethers, esters, alcohols, amides (e.g. dimethylformamide), sulfoxides (e.g. dimethylsulfoxide), nitriles (e.g. acetonitrile) and the like. The organic solvent preferably has a solubility parameter of 8.0 to 20.0, more preferably 8.2 to 18.0 [cgs units], based upon units of solubility $[cal/cm^3]^{\frac{1}{2}}$. Solubility parameters of less than 8.0 give rise to precipitation of solid components. The organic solvent may be present in the coating composition in an amount of 1 to 1,000 parts by weight based on the amount of the solid ingredients.

The coating composition according to the present invention may be used for various kinds of use, for example the final coating, the intermediate coating, the undercoating and the like, and used as various kinds of paint, for example paints for automobiles, paints for household electric utensiles and industrial paints.

In the curing reaction of the substituted acylamide compound, the substituted acylamide group is attacked by the active hydrogen containing compound, e.g. the hydroxyl group containing compound, and cured with the active hydrogen containing compound by means of a nucleophilic substitution reaction, as shown in the following reaction equation;

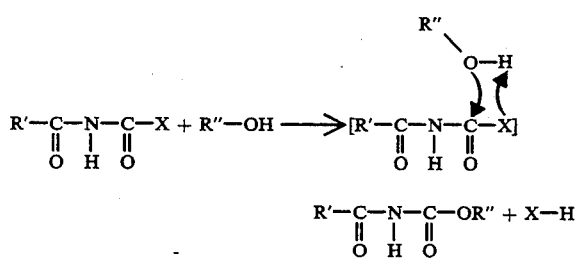

[wherein R' and R" represent alkyl groups and X represents the same as mentioned in the formula (1).]

As above described, the coating composition according to the present invention has a substituted acylamide group which is reacted with the active hydrogen atom by heating to form a cured film. The substituted acylamide group is stable at ambient temperature, so that the coating composition containing the same can be used as a one pack coating composition. The coating composition of the present invention shows advantages in that the curing degree is constant within a certain temperature range, for example a range of 80° to 140° C., and thus the curing conditions can be very easily selected.

EXAMPLE

The present invention is illustrated by the following Examples which, however, are not to be construed as limiting the present invention to their details.

Preparation of vinyl polymer A

To 400 g of butyl acetate was added 316 g of methyl methacrylate, 116 g of n-butyl acrylate and 82.5 g of N-(t-butoxycarbonyl)methacrylamide to dissolve at 120° C., to which a mixture of 10 g of azobisisobutyronitrile and 100 g of butyl acetate was added dropwise with stirring in nitrogen atomosphere. It was then aged for 2 hours to obtain a polymer A having a nonvolatile content of 46.9% by weight and a number average molecular weight of 10,000.

Synthesis of B-G

A polymer composition was synthesized from the monomers and solvents shown in Table-1 in the same manner as the vinyl polymer A. The number average molecular weight and nonvolatile content are shown in Table 1.

Examples 1 to 6

(Synthesis of pigment pastes)

The vinyl polymer composition (c) and the pigment (d) were preliminary mixed with xylol or without any solvent, and then ground with glass beads at room temperature for 40 minutes in a paint conditioner to form a pigment paste.

(Preparation of coating compositions)

One vinyl polymer, another vinyl polymer and the pigment paste were mixed with stirring at room temperature to obtain a coating composition.

(Baking process)

The respective coating compositions according to Examples 1 to 6 were diluted with the solvent used in the polymerization to regulate the viscosity at 30 seconds as measured by means of the Ford cup #4. The resulting coating compositions were sprayed on a steel plate in accordance with the usual method and set for 5 minutes followed by baking for 30 minutes at 120° C. to obtain a three-dimensional cured film.

The pencil hardness, the solvent resistance and water resistance of the respective compositions are shown in Table-2.

TABLE 2

| | Examples No. | | | | |
|---|---|---|---|---|---|
| | 1 | 2 | 3 | 4 | 5 |
| (a) Vinyl polymer (weight) | A (168) | B (100) | C (100) | D (102) | E (200) |
| (b) Another vinyl polymer (weight) | F (134) | F (25) | G (280) | G (200) | |
| Pigment paste | | | | | |
| (c) Vinyl polymer (weight) | — ( ) | F (70) | — | G (70) | E (70) |
| (d) Pigment (weight) | — ( ) | Taipake* CR-95 (40) | — | CR-95 (50) | CR-95 (50) |
| Pencil hardness | 3H | H | 2H | H | H |
| Solvent resistance | o | o | o | o | o |

*White titanium oxide pigment available from Ishihara Sangyo Co., Ltd.

Example 6

(Preparation of a coating composition)

A coating composition was prepared by mixing the above obtained polymer and 40.2 g of trimethylolpropane.

TABLE 1

| | | Vinyl polymer composition | | | | | | |
|---|---|---|---|---|---|---|---|---|
| | | A | B | C | D | E | F | G |
| Monomer | $M_1^{1)}$ | 82.5 | 113.9 | | | 130 | | |
| | $M_2^{2)}$ | | | 200 | | | | |
| | $M_3^{3)}$ | | | | 200 | | | |
| | Styrene | | 100 | 150 | 150 | 70 | | 150 |
| | Methyl methacrylate | 316 | 67.5 | | | 425.5 | 150 | |
| | n-Butyl acrylate | 116 | | | 210 | 237.5 | | |
| | Ethyl acrylate | | 63.0 | | | | | |
| | 2-Ethylhexyl acrylate | | 154.0 | 300 | 300 | | | 145 |
| | Methacrylic acid | | 43.6 | | | | | 5 |
| | 2-Hydroxyethyl methacrylate | | | | | 90 | 87.0 | 23.7 |
| Solvent | | Butyl acetate | t-Butanol | Butyl acetate | Butyl acetate | t-Butanol | Butyl acetate | Butyl acetate |
| Sp | | 8.47 | 10.82 | | | | | |
| Nonvolatile content (%) | | 46.9 | 39.3 | 45.0 | 45.0 | 25.0 | 60.6 | 50.0 |
| Number average molecular weight | | 10,000 | 8,000 | 5,000 | 10,000 | 11,000 | 9,800 | 8,000 |

1) N-(t-butoxycarbonyl)methacrylamide
2) N-(ε-caprolctamcarbonyl)methacrylamide
3) N-(2,6-di-t-butyl-p-methylphenoxycarbonyl)methacrylamide (Baking process)

The obtained coating composition was applied on a steel panel by a bar coater and allowed to leave for 5 minutes. It was then baked at 120° C. for 30 minutes to obtained a cured film.

The obtained film had a pencil hardness of 2H and excellent solvent resistance.

What is claimed is:

1. A solvent based coating composition comprising:
   (i) a vinyl polymer having a substituted acylamide group represented by the formula

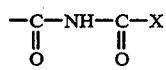

wherein X represents an alkoxy group, an amino group, an amide group, an iminooxy group, a sulfide group, or a mixture thereof;
   (ii) a vinyl polymer other than the vinyl polymer of (i), having an active hydrogen-containing group selected from the group consisting of a hydroxyl group, a carboxyl group, an amino group, a thiol group, a sulfonic acid group and mixtures thereof; and
   (iii) an organic solvent having a solubility parameter of 8.0 to 20.0.

2. The coating composition according to claim 1 wherein said substituted acylamide group is present in an equivalence of $1 \times 10^{-5}$ or more.

3. The coating composition according to claim 1 wherein said active hydrogen is present in an equivalence of $1 \times 10^{-5}$ or more.

4. The coating composition according to claim 1 wherein at least 6 substituted acylamide groups are present in one molecule of said vinyl polymer (i).